United States Patent [19]

Hamer et al.

[11] Patent Number: 5,804,610
[45] Date of Patent: Sep. 8, 1998

[54] METHODS OF MAKING PACKAGED VISCOELASTIC COMPOSITIONS

[75] Inventors: Craig E. Hamer, Woodbury; John D. Moon, Hastings; Thomas A. Kotnour, Faribault, all of Minn.

[73] Assignee: Minnesota Mining and Manufacturing Company, St. Paul, Minn.

[21] Appl. No.: 919,756

[22] Filed: Aug. 28, 1997

Related U.S. Application Data

[63] Continuation of Ser. No. 596,897, Mar. 13, 1996, which is a continuation-in-part of Ser. No. 303,602, Sep. 9, 1994, abandoned.

[51] Int. Cl.[6] .............................. B65B 5/00; C09J 4/02; B32B 27/16; B32B 27/30
[52] U.S. Cl. ........................ 522/182; 522/34; 522/37; 522/8; 428/515; 428/516; 428/517; 428/522; 156/275.7; 156/327; 526/218.1; 526/328; 526/328.5; 53/111 RC; 53/428; 53/440; 206/447
[58] Field of Search ...................... 522/34, 182, 8, 522/19, 23, 120, 121; 526/218.1, 328, 328.5; 428/515, 516, 517, 522; 156/275.7, 327; 53/111 RC, 428, 440; 206/447

[56] References Cited

U.S. PATENT DOCUMENTS

| | | | |
|---|---|---|---|
| 3,383,339 | 5/1968 | Bader et al. ............................ | 260/2.5 |
| 4,052,527 | 10/1977 | Pastor et al. ............................ | 428/463 |
| 4,181,752 | 1/1980 | Martens et al. ......................... | 427/54.1 |
| 4,190,156 | 2/1980 | Adam ..................................... | 206/447 |
| 4,329,384 | 5/1982 | Vesley et al. ............................ | 428/40 |
| 4,330,590 | 5/1982 | Vesley .................................... | 428/336 |
| 4,554,324 | 11/1985 | Husman et al. ........................ | 525/301 |
| 4,737,559 | 4/1988 | Kellen et al. ........................... | 526/291 |
| 4,810,523 | 3/1989 | Williams et al. ........................ | 427/36 |
| 5,109,892 | 5/1992 | Somers .................................... | 141/11 |
| 5,257,491 | 11/1993 | Rouyer et al. .......................... | 53/428 |
| 5,333,439 | 8/1994 | Bozich et al. .......................... | 53/450 |
| 5,373,682 | 12/1994 | Hatfield et al. ......................... | 53/440 |

FOREIGN PATENT DOCUMENTS

| | | |
|---|---|---|
| 0 547 798 | 6/1993 | European Pat. Off. . |
| 0 608 891 | 8/1994 | European Pat. Off. . |
| 1 694 837 A | 7/1971 | Germany . |
| 1 694 837.1 | 7/1971 | Germany . |
| 36 25 358 | 6/1989 | Germany . |
| 42 05 919 | 9/1993 | Germany . |
| 63-273601 | 11/1988 | Japan . |
| WO 89/00106 | 1/1989 | WIPO . |
| WO 93/23224 | 11/1993 | WIPO . |
| WO 96/07522 | 3/1996 | WIPO . |

*Primary Examiner*—Susan W. Berman
*Attorney, Agent, or Firm*—James J. Trussell

[57] ABSTRACT

Methods for preparing viscoelastic compositions (e.g., adhesives such as hot melt adhesives) in which a pre-viscoelastic composition (e.g., a pre-adhesive composition) is combined with a packaging material and then polymerized by transmissive energy.

27 Claims, No Drawings

5,804,610

METHODS OF MAKING PACKAGED VISCOELASTIC COMPOSITIONS

CROSS REFERENCE TO RELATED APPLICATIONS

This is a continuation of application Ser. No. 08/596,897 filed Mar. 13, 1996, which is a continuation-in-part of Hamer et al., U.S. Ser. No. 08/303,602 filed Sep. 9, 1994 entitled "Method of Making a Packaged Hot Melt Adhesive," which is assigned to the same assignee as the present application and hereby incorporated by reference.

BACKGROUND OF THE INVENTION

The present invention relates to making viscoelastic compositions.

Methods of making packaged viscoelastic compositions such as hot melt adhesives and the resulting packaged compositions are known. German Patent No. 36 25 358 describes a hot melt adhesive block in a thermoplastic film. The film is melted and mixed with the adhesive in an extrusion process.

U.S. Pat. No. 5,257,491 describes a method of packaging a thermoplastic or thermosetting hot melt adhesive in which a portion of an adhesive composition is surrounded with a plastic packaging material. The plastic packaging material does not substantially adversely affect the adhesive characteristics of a molten mixture of the adhesive and the plastic packaging material.

PCT International Publication No. WO 93/23224 describes a method for packaging hot melt adhesive compositions in which molten hot melt adhesive is poured into a mold lined with a plastic film. The plastic film is meltable with the adhesive composition and blendable into the molten adhesive composition.

A method for producing thermoplastic mold materials useful for producing molded articles is described in German Patent Disclosure 1 694 837, published Jul. 29, 1971. In the described method, the polymerization material is allowed to polymerize in a hollow profile that functions as a polymerization vessel. The hollow profile may be made of the same polymer produced in the polymerization process.

Methods of producing hot melt adhesives in sealed reaction vessels are known. U.S. Pat. No. 4,810,523 describes a method for producing hot melt adhesives in which a polymerizable monomer composition is introduced into a sealable reaction vessel and polymerized by ionizing radiation. The adhesive is then removed from the reaction vessel before hot melt application. The reaction vessel may be a lined cylindrical pressure vessel or a multilayer bag. See column 8, line 58, to column 9, line 8, of U.S. Pat. No. 4,810,523.

Although methods of producing viscoelastic compositions such as hot melt adhesives and methods of packaging such compositions are known, there is a need for a simplified process for making such compositions.

SUMMARY OF THE INVENTION

In a first aspect, the invention features a method of forming a hot melt adhesive composition that includes the steps of:

(a) combining (i) a pre-adhesive composition which upon exposure to transmissive energy polymerizes to form a hot melt adhesive composition and (ii) a packaging material to form a packaged pre-adhesive composition, the packaging material being selected such that it does not substantially adversely affect the adhesive properties of the hot melt adhesive composition when the hot melt adhesive composition and the packaging material are melted and mixed together; and (b) exposing the packaged pre-adhesive composition to transmissive energy to polymerize the pre-adhesive composition to form a packaged hot melt adhesive composition. The packaged hot melt adhesive composition may then be melted if desired.

In some preferred embodiments, the pre-adhesive composition is combined with the packaging material by substantially or completely surrounding the pre-adhesive composition with the packaging material. In other preferred embodiments, the pre-adhesive composition is combined with the packaging material by disposing the pre-adhesive composition on the surface of a sheet, or between a pair of sheets; in the latter case, at least one of the sheets is selected such that it does not substantially adversely affect the adhesive properties of the hot melt adhesive composition when the hot melt adhesive composition and the sheet are melted and mixed together. In yet another preferred embodiment, the packaging material is in the form of a hollow profile in which the ratio of the length to the square root of the cross-sectional area of the profile is at least about 30:1.

The pre-adhesive composition may be contacted with a heat exchange medium (e.g., water) while exposing the packaged pre-adhesive composition to transmissive energy to polymerize the pre-adhesive composition. Examples of preferred sources of transmissive energy include ultraviolet radiation and thermal conduction. The polymerization reaction may progress to full (or nearly full) conversion. Preferably, the degree of conversion is at least 80%, and more preferably at least 90%.

The pre-adhesive composition preferably has a viscosity less than about 50,000 centipoise at 25° C., and more preferably less than about 50 centipoise at 25° C. The melting point of the pre-adhesive composition preferably is no greater than about 40° C., more preferably no greater than about 25° C., and even more preferably no greater than about 0° C. One example of a preferred pre-adhesive composition includes the following materials:

(a) 50 to 100 parts by weight of a polymerizable component that includes at least one acrylic or methacrylic ester of a non-tertiary alkyl alcohol in which the alkyl group contains 1 to 20 carbon atoms;

(b) 0 to 50 parts by weight of a polymerizable component that includes at least one modifying monomer, other than the acrylic or methacrylic ester, copolymerizable with component (a), the sum of (a) and (b) amounting to 100 parts by weight;

(c) an effective amount of a polymerization initiator; and (d) an effective amount of a chain transfer agent. The pre-adhesive composition may also include a crosslinking agent.

The invention also features a packaged pre-adhesive composition that includes (i) a pre-adhesive composition which upon exposure to transmissive energy polymerizes to form a hot melt adhesive composition and (ii) a packaging material, in which the packaging material is selected such that it does not substantially adversely affect the adhesive properties of the hot melt adhesive composition when the hot melt adhesive composition and the packaging material are melted and mixed together.

In a second aspect, the invention features a method of forming a viscoelastic composition that includes the steps of:

(a) combining (i) a pre-viscoelastic composition which upon exposure to transmissive energy polymerizes to form a viscoelastic composition and (ii) a packaging material to form a packaged pre-viscoelastic composition, the packaging material being selected such that it does not substantially adversely affect the viscoelastic properties of said viscoelastic composition when the viscoelastic composition and the packaging material are melted and mixed together; and (b) exposing the packaged pre-viscoelastic composition to transmissive energy to polymerize the pre-viscoelastic composition to form a packaged viscoelastic composition. An example of a preferred viscoelastic composition is a hot melt adhesive composition which is prepared by polymerizing a pre-adhesive composition upon exposure to transmissive energy.

In a third aspect, the invention features a method of forming an adhesive composition that includes the steps of:

(a) combining (i) a pre-adhesive composition which upon exposure to ultraviolet radiation, thermal conduction, or a combination thereof polymerizes to form an adhesive composition and (ii) a packaging material to form a packaged pre-adhesive composition by substantially surrounding the pre-adhesive composition with the packaging material; and (b) exposing the packaged pre-adhesive composition to ultraviolet radiation, thermal conduction, or a combination thereof to polymerize the pre-adhesive composition to form a packaged adhesive composition. The packaged composition may then be melted if desired.

An example of a preferred adhesive composition is a hot melt adhesive composition. Another example of a preferred adhesive composition is a pressure sensitive adhesive composition (which may or may not be a hot melt adhesive as well).

In one preferred embodiment, the pre-adhesive composition is combined with the packaging material by completely surrounding the pre-adhesive composition with the packaging material. The packaging material is preferably selected such that it does not substantially adversely affect the adhesive properties of the adhesive composition when the adhesive composition and the packaging material are melted and mixed together. Alternatively, the packaging material may be removed from the adhesive composition prior to melting (in which case the effect of the packaging material on the adhesive properties of the adhesive is of no consequence as a practical matter).

Packaged compositions in which the packaging material is removed prior to melting are the subject of yet another aspect of the invention. Specifically, a fourth aspect of the invention features a method of forming a hot melt adhesive composition that includes the steps of:

(a) disposing on the surface of a sheet a pre-adhesive composition which upon exposure to transmissive energy polymerizes to form a hot melt adhesive composition;

(b) exposing the pre-adhesive composition to transmissive energy to polymerize the pre-adhesive composition to form a hot melt adhesive composition;

(c) removing the sheet from the hot melt adhesive composition; and (d) melting the hot melt adhesive composition.

The pre-adhesive composition is preferably disposed on the sheet in the form of a layer having a thickness ranging from about 1.2 to about 8 mm. Examples of preferred sheets include flexible thermoplastic sheets. According to one preferred embodiment, the pre-adhesive composition is disposed between a pair of sheets (e.g., flexible thermoplastic sheets), and both of said sheets are removed prior to melting the hot melt adhesive composition.

In one preferred embodiment, the method includes the steps of disposing the melted hot melt adhesive composition on the surface of a sheet to form a hot melt adhesive-coated sheet, and exposing the hot melt adhesive-coated sheet to ultraviolet radiation or ionizing radiation to form a pressure sensitive adhesive-coated sheet. For example, the method may include the steps of exposing the pre-adhesive composition to ultraviolet radiation characterized by a first peak wavelength (e.g., ranging from about 220 to about 400 nanometers, with an average light intensity ranging from about 0.01 to about 20 mW/cm$^2$) to polymerize the pre-adhesive composition to form a hot melt adhesive composition; removing the sheet from the hot melt adhesive composition; disposing the melted hot melt adhesive composition on the surface of a sheet to form a hot melt adhesive-coated sheet; and exposing the hot melt adhesive-coated sheet to ultraviolet radiation characterized by a second peak wavelength and/or intensity different from said first peak wavelength and/intensity (e.g., ranging from about 280 to about 400 nanometers, with an average light intensity ranging from about 20 to about 200 mW/cm$^2$) to form a pressure sensitive adhesive-coated sheet.

The pre-adhesive composition preferably has a viscosity less than about 50,000 centipoise at 25° C. The melting point of the pre-adhesive composition preferably is no greater than about 40° C., more preferably no greater than about 25° C., and even more preferably no greater than about 0° C. Moreover, the pre-adhesive composition is preferably substantially free of solvents and, in some cases, thixotropic agents.

One example of a preferred pre-adhesive composition includes the following materials:

(a) 50 to 100 parts by weight of a polymerizable component that includes at least one acrylic or methacrylic ester of a non-tertiary alkyl alcohol in which the alkyl group contains 1 to 20 carbon atoms;

(b) 0 to 50 parts by weight of a polymerizable component that includes at least one modifying monomer, other than the acrylic or methacrylic ester, copolymerizable with component (a), the sum of (a) and (b) amounting to 100 parts by weight;

(c) an effective amount of a polymerization initiator; and (d) an effective amount of a chain transfer agent. The pre-adhesive composition may also include a cross-linking agent.

The hot melt adhesive composition preferably has a weight average molecular weight ranging from about 100,000 to about 1,500,000.

Additional features and advantages of the invention will be set forth in the description which follows, and in part will be apparent from the description, or may be learned by practice of the invention. The objectives and other advantages of the invention will be realized and attained by the methods and articles particularly pointed out in the written description and claims hereof.

It is to be understood that both the foregoing general description and the following detailed description are exemplary and explanatory and are intended to provide further explanation of the invention as claimed.

DETAILED DESCRIPTION OF THE INVENTION

The present invention provides methods for making packaged viscoelastic compositions in which the packaging material is either retained following polymerization (and thus becomes part of the final product) ("Type I Composition"), or is removed following polymerization and prior to subsequent processing ("Type II Composition"). The two types of products will be addressed separately below. The description of the two types of products will be made with particular reference to hot melt adhesive compositions. However, the principles described below are equally applicable to other types of viscoelastic compositions, including pressure sensitive adhesives generally, hot melt processable sealants, vibration damping materials, and gels for medical applications.

Type I Compositions

The present invention provides a method of making a packaged, thermoplastic or thermosettable hot melt adhesive comprising:

(a) providing a pre-adhesive composition which upon exposure to transmissive energy polymerizes to provide a thermoplastic or thermosettable hot melt adhesive;

(b) substantially surrounding the pre-adhesive composition with a packaging material;

(c) exposing the pre-adhesive composition to transmissive energy capable of polymerizing said pre-adhesive composition; and (d) allowing polymerization of the pre-adhesive composition to occur to provide said thermoplastic or thermosettable hot melt adhesive.

The packaging material is selected such that it does not substantially adversely affect the desired adhesive properties of the hot melt adhesive composition when the hot melt adhesive composition and the packaging material are melted and mixed together. Preferably, a hot melt coated mixture of the adhesive and the packaging material has a storage modulus when measured in torsional shear at 25° C. and at 1 radian/second of between about $10^4$ and about $10^8$ dynes/$cm^2$, and (in the case of vibration damping materials) a loss factor of at least about 0.01, more preferably 0.05 to about 10. The desired adhesive properties are determined by the requirements of the end user; desired adhesive properties include peel strength and shear strength. The pre-adhesive composition preferably polymerizes to provide a thermoplastic hot melt adhesive upon exposure to transmissive energy.

The invention also provides a method of making two or more packages of a packaged, thermoplastic or thermosettable hot melt adhesive. In this method, two or more portions of a pre-adhesive composition are provided and each of the portions is completely surrounded with a packaging material. These portions are then polymerized as described above.

In one preferred embodiment, the pre-adhesive composition is completely surrounded by the packaging material. Preferably, from 0.1 to 500 g of pre-adhesive composition is completely surrounded by the packaging material. In another preferred embodiment, from 3 to 100 g of pre-adhesive composition is completely surrounded by the packaging material. In another embodiment of the invention, the pre-adhesive composition is substantially surrounded by the packaging material. In yet another embodiment, the pre-adhesive composition is disposed on the surface of a sheet, or between a pair of two substantially parallel sheets of packaging material. In another embodiment of the invention, the pre-adhesive composition is substantially or completely surrounded by a hollow profile of packaging material with a length:square root of the cross-sectional area ratio of at least 30:1.

The pre-adhesive composition preferably has a melting point of 40° C. or less, more preferably 25° C. or less. In a preferred embodiment, the melting point of the pre-adhesive composition is 0° C. or less. The pre-adhesive composition preferably has a viscosity at 25° C. of less than 50,000 centipoise, more preferably 5,000 centipoise. When the pre-adhesive composition is an unfilled monomeric mixture, a viscosity of less than 50 centipoise at 25° C. is preferred.

The pre-adhesive composition may be a monomeric mixture or a prepolymeric mixture. A prepolymeric mixture is a syrup formed by the partial polymerization of the monomeric materials that can be polymerized to form a hot melt adhesive. Preferably, the monomeric materials can be polymerized to form a hot melt pressure sensitive adhesive composition.

A small amount of volatile, non-polymerizable solvent may be included in the pre-adhesive composition to dissolve other additives, such as a crosslinking agent. The pre-adhesive composition preferably contains less than 10 weight percent of solvent. In a preferred embodiment, the pre-adhesive composition contains less than 5 weight percent of solvent, and in another preferred embodiment, the pre-adhesive composition contains less than 1 weight percent of solvent. In a preferred embodiment, the pre-adhesive composition is essentially free of solvent.

Preferred materials for producing a hot melt pressure sensitive adhesive include acrylate and methacrylate polymers or co-polymers. Such polymers can be formed by polymerizing 50 to 100 parts by weight of one or more monomeric acrylic or methacrylic esters of non-tertiary alkyl alcohols, with the alkyl groups having from 1 to 20 carbon atoms (e.g., from 3 to 18 carbon atoms). Suitable acrylate monomers include methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, isobornyl acrylate, and dodecyl acrylate. Also useful are aromatic acrylates, e.g., benzyl acrylate and cyclobenzyl acrylate.

In some applications, it may be desirable to use less than 50 parts by weight of the monomeric acrylic or methacrylic esters. For example, in the case of gels for medical applications, e.g., bioelectrodes, the amount of monomeric acrylic or methacrylic ester may range from 0–50 parts by weight.

Optionally, one or more monoethylenically unsaturated co-monomers may be polymerized with the acrylate monomers in amounts from about 0 to 50 parts co-monomer. One class of useful co-monomers includes those having a homopolymer glass transition temperature greater than the glass transition temperature of the acrylate homopolymer. Examples of suitable co-monomers falling within this class include acrylic acid, acrylamide, methacrylamide, substituted acrylamides such as N,N-dimethyl acrylamide, itaconic acid, methacrylic acid, acrylonitrile, methacrylonitrile, vinyl acetate, N-vinyl pyrrolidone, isobornyl acrylate, cyano ethyl acrylate, N-vinylcaprolactam, maleic anhydride, hydroxyalkylacrylates, N,N-dimethyl aminoethyl (meth) acrylate, N,N-diethylacrylamide, beta-carboxyethyl acrylate, vinyl esters of neodecanoic, neononanoic, neopentanoic, 2-ethylhexanoic, or propionic acids (e.g., available from Union Carbide Corp. of Danbury, Conn. under the designation "Vynates"), vinylidene chloride, styrene, vinyl toluene, and alkyl vinyl ethers.

A second class of useful co-monomers includes those having a homopolymer glass transition temperature less than the glass transition temperature of the acrylate homopolymer. Examples of suitable co-monomers falling within this class include ethoxyethoxy ethyl acrylate (Tg=−71° C.) and methoxypolyethylene glycol 400 acrylate (Tg=−65° C.; available from Shin Nakamura Chemical Co., Ltd. under the designation "NK Ester AM-90G").

Depending upon the method of polymerization, the pre-adhesive composition may include an appropriate initiator. For polymerization by ultraviolet light, a photoinitiator is included. Useful photoinitiators include substituted acetophenones such as benzyl dimethyl ketal and 1-hydroxycyclohexyl phenyl ketone, substituted alpha-ketols such as 2-methyl-2-hydroxypropiophenone, benzoin ethers such as benzoin methyl ether, benzoin isopropyl ether, substituted benzoin ethers such as anisoin methyl ether, aromatic sulfonyl chlorides, and photoactive oximes. The photoinitiator may be used in an amount from about 0.001 to about 5.0 parts by weight per 100 parts of total monomer, preferably from about 0.01 to about 5.0 parts by weight per 100 parts of total monomer, and more preferably in an amount from 0.1 to 0.5 parts by weight per 100 parts of total monomer.

For thermal polymerization, a thermal initiator is included. Thermal initiators useful in the present invention include, but are not limited to azo, peroxide, persulfate, and redox initiators.

Suitable azo initiators include, but are not limited to, 2,2'-azobis(2,4-dimethylvaleronitrile) (VAZO™ 52); 2,2'-azobis(isobutyronitrile) (VAZO™ 64); 2,2'-azobis-2-methylbutyronitrile (VAZO™ 67); and (1,1'-azobis(1-cyclohexanecarbonitrile) (VAZO™ 88), all of which are available from DuPont Chemicals, and 2,2'-azobis(methyl isobutyrate) (V-601) and 2,2'-azobis(2-amidinopropane) dihydrochloride (V-50) available from Wako Chemicals. Also suitable is 2,2'-azobis(4-methoxy-2,4-dimethylvaleronitrile), formerly available from DuPont Chemicals as VAZO™ 33.

Suitable peroxide initiators include, but are not limited to, benzoyl peroxide, acetyl peroxide, lauroyl peroxide, decanoyl peroxide, dicetyl peroxydicarbonate, di(4-t-butylcyclohexyl) peroxydicarbonate (PERKADOX™ 16S, available from AKZO Chemicals), di(2-ethylhexyl) peroxydicarbonate, t-butylperoxypivalate (Lupersol™ 11, available from Atochem), t-butylperoxy-2-ethylhexanoate (Trigonox™ 21-C50, available from Akzo Chemicals, Inc.), and dicumyl peroxide.

Suitable persulfate initiators include, but are not limited to, potassium persulfate, sodium persulfate, and ammonium persulfate.

Suitable redox (oxidation-reduction) initiators include, but are not limited to, combinations of the above persulfate initiators with reducing agents such as sodium metabisulfite and sodium bisulfite; systems based on organic peroxides and tertiary amines (for example, benzoyl peroxide plus dimethylaniline); and systems based on organic hydroperoxides and transition metals, for example, cumene hydroperoxide plus cobalt naphthenate.

Other initiators include, but are not limited to pinacols, such as tetraphenyl 1,1,2,2-ethanediol.

Preferred thermal free-radical initiators are selected from the group consisting of azo compounds and peroxides. Most preferred are Lupersol™ 11 and Perkadox™ 16, and mixtures thereof.

The thermal initiator may be used in an amount from about 0.01 to about 5.0 parts by weight per 100 parts of total monomer, preferably from 0.025 to 2 weight percent.

A combination of thermal and photoinitiation may also be used to prepare compositions according to the invention. For example, the pre-adhesive composition may polymerized, e.g., in a reactive extruder, to a certain conversion using a thermal initiator, the resulting composition (still in a pre-adhesive state) combined with packaging material (e.g., in the form of a pouch or shell) and a photoinitiator, and the polymerization completed upon exposure to ultraviolet radiation. Conversely, the initial polymerization may be initiated by a photoinitiator, and the polymerization subsequently completed using a thermal initiator. The thermal and photoinitiator may also be used together, rather than being added sequentially.

Preferably, the composition also includes a chain transfer agent to control the molecular weight of the polymer. Chain transfer agents are materials which regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and 2-mercaptoethyl ether; and solvents such as ethanol, isopropanol, and ethyl acetate.

The amount of chain transfer agent that is useful depends upon the desired molecular weight and the type of chain transfer agent. Solvents are useful as chain transfer agents, but they generally are not as active as, for example, the sulfur compounds. The chain transfer agent is typically used in amounts from about 0.001 part to about 10 parts by weight per 100 parts of total monomer, and preferably from about 0.01 part to about 0.5 part, and most preferably from about 0.02 part to about 0.20 part.

A preferred pre-adhesive composition comprises:
(a) 50 to 100 parts by weight of a polymerizable component comprising at least one acrylic or methacrylic ester of a non-tertiary alkyl alcohol in which the alkyl group contains 1 to 20 (e.g., 3 to 18) carbon atoms;
(b) 0 to 50 parts by weight of a polymerizable component comprising at least one modifying monomer, other than said acrylic or methacrylic ester, copolymerizable with component (a), the sum of (a) and (b) amounting to 100 parts by weight;
(c) an effective amount of a polymerization initiator; and
(d) an effective amount of a chain transfer agent. The polymerization initiator is preferably a photoinitiator or a thermal initiator.

The pre-adhesive composition may further comprise an effective amount of a crosslinking agent that may be activated after the adhesive has been hot melt coated. Typically, the amount ranges from about 0.01 to about 5.0 parts based upon 100 parts of components (a) plus (b). The crosslinking agent can be added to the polymerized adhesive before or during hot melt coating, or it can be added to the pre-adhesive composition. When added to the pre-adhesive composition, the crosslinking agent can remain intact as a separate species in the adhesive, or it can be co-polymerized with the monomers. Crosslinking is preferably initiated after hot melt coating, and the crosslinking is preferably initiated by ultraviolet radiation, or ionizing radiation such as gamma radiation or electron beam (the use of separate crosslinking agents being optional in the case of ionizing radiation). Preferred crosslinking agents that can be added after polymerization and before hot melt coating include multifunctional acrylates such as 1,6-hexanedioldiacrylate and trimethylolpropane triacrylate, and substituted triazines such as 2,4-bis(trichloromethyl)-6-(4-methoxyphenyl)-s-triazine and 2,4-bis(trichloromethyl)-6-(3,4-dimethoxyphenyl)-s-triazine, as described in U.S. Pat. Nos. 4,329,384 (Vesley et al.) and 4,330,590 (Vesley). Another class of preferred crosslinking agents are the copolymerizable monoethylenically unsaturated aromatic ketone comonomers free of ortho-aromatic hydroxyl groups such as those disclosed in U.S. Pat. No. 4,737,559 (Kellen et al.). Specific examples include para-acryloxybenzophenone, para-acryloxyethoxybenzophenone, para-N-(methylacryloxyethyl)-carbamoylethoxybenzophenone, para-acryloxyacetophenone, ortho-acrylamidoacetophenone, acrylated anthraquinones, and the like.

Yet another suitable crosslinking agent is 1,5-bis(4-benzoylbenzoxy) pentane. Also suitable are hydrogen-abstracting carbonyls such as anthraquinone, benzophenone, and derivatives thereof, as disclosed in Martens et al., U.S. Pat. No. 4,181,752, hereby incorporated by reference.

The acrylate copolymers can be crosslinked by exposure to ultraviolet radiation from, for example, medium pressure mercury arc lamps. It is preferred that crosslinking agents activated by ultraviolet radiation be primarily activated by a different wavelength of energy than that used for the polymerization. For example, low intensity black lights may be used for polymerization and mercury arc lamps may be used for the subsequent crosslinking.

The pre-adhesive composition can further include tackifying resins to increase the tack of the adhesive. The tackifying resins can also be added during the hot melt coating step. Suitable tackifying resins include rosin esters, terpenes, phenols, and aliphatic, aromatic, or mixtures of aliphatic and aromatic synthetic hydrocarbon pure monomer resins. Examples of useful tackifying resins that are commercially available include Foral™85 and hydrocarbon resins sold under the Regalrez™ tradename by Hercules, Inc., ECR-180 available from Exxon Chemicals, and SP553 terpene phenolic resin available from Schenectady International, Inc. If used, the amount of tackifying resin can range from about 1 part to about 50 parts by weight per 100 parts of total monomer.

In some cases, polymers may be dissolved in the monomers before polymerization to modify the adhesive characteristics, or to make a syrup or monomeric mixture. Examples of such polymers include silicone pressure sensitive adhesives, acrylic polymers and copolymers, ethylene-vinyl acetate copolymers, acrylonitrile copolymers, and co-polymerizable macromers such as those described in U.S. Pat. No. 4,554,324 (Husman et al.).

Other additives can be included in the pre-adhesive composition, or added at the time of hot melt coating to change the properties of the adhesive. Such additives, or fillers, include plasticizers, pigments, glass or polymeric bubbles or beads (which may be expanded or unexpanded), fibers, reinforcing agents, hydrophobic or hydrophilic silica, calcium carbonate, toughening agents, fire retardants, antioxidants, finely ground polymeric particles such as polyester, nylon, and polypropylene, and stabilizers. The additives are added in amounts sufficient to obtain the desired end properties.

The packaging material is made of a material that when combined with the adhesive does not substantially adversely affect the desired adhesive characteristics. A hot melt coated adhesive produced from a mixture of the adhesive and the packaging material may have improved adhesive properties compared to hot melt coated adhesive produced from adhesive alone.

In one embodiment of the invention, the pre-adhesive composition is substantially surrounded with the packaging material; in another embodiment of the invention, the pre-adhesive composition is completely surrounded with the packaging material. In this embodiment, it is intended that the pre-adhesive composition be completely surrounded by the packaging material, but random variations in production may produce occasional packaged pre-adhesives in which the pre-adhesive composition is not completely surrounded with the packaging material. It yet other embodiments, the pre-adhesive composition is disposed on the surface of a sheet, or between a pair of sheets.

The packaging material preferably melts at or below the processing temperature of the adhesive (i.e., the temperature at which the adhesive flows). The packaging material preferably has a melting point of 200° C. or less, preferably 170° C. or less. In a preferred embodiment the melting point ranges from 90° C. to 150° C. The packaging material may be a flexible thermoplastic polymeric film. The packaging material is preferably selected from ethylene-vinyl acetate, ethylene-acrylic acid, polypropylene, polyethylene, polybutadiene, or ionomeric films. In a preferred embodiment the packaging material is an ethylene-acrylic acid or ethylene-vinyl acetate film.

In the practice of the invention, films ranging in thickness from about 0.01 mm to about 0.25 mm may be used. The thicknesses preferably range from about 0.025 mm to about 0.127 mm to obtain films that have good strength during processing while being thin enough to heat seal quickly and minimize the amount of film material used.

The amount of packaging material depends upon the type of material and the desired end properties. The amount of packaging material typically ranges from about 0.5 percent to about 20 percent of the total weight of the pre-adhesive composition and the packaging material. Preferably, the packaging material is between 2 percent and 15 percent by weight, and more preferably between 3 percent and 5 percent. Such packaging materials may contain plasticizers, stabilizers, dyes, perfumes, fillers, slip agents, antiblock agents, flame retardants, anti-static agents, microwave susceptors, thermally conductive particles, electrically conductive particles, and/or other materials to increase the flexibility, handleability, visibility, or other useful property of the film, as long as they do not adversely affect the desired properties of the adhesive.

The packaging material should be appropriate for the polymerization method used. For example, with photopolymerization, it is necessary to use a film material that is sufficiently transparent to ultraviolet radiation at the wavelengths necessary to effect polymerization.

The transmissive energy may be selected from ultraviolet radiation, visible radiation, thermal radiation, or thermal conduction. The transmissive energy is preferably ultraviolet radiation or thermal conduction. Preferably, at least 80 percent of the pre-adhesive is converted to adhesive; more preferably, at least 90 percent of the pre-adhesive is converted to adhesive.

Thermal polymerization can be effected by immersing the packaged composition in a heat exchange medium at temperatures between about 40° C. and 100° C. for a time sufficient to polymerize the composition. The heat exchange medium may be a forced or impinged gas or a liquid such as water, perfluorinated liquids, glycerine, or propylene glycol. The heat necessary for thermal polymerization may also be provided by a metal platen, heated metal rolls, or microwave energy.

The temperature at which the polymerization occurs depends upon the activation temperature of the initiator. For example, polymerization using VAZO™64, a commercially available initiator from DuPont Company can be carried out at about 80° C., while Vazo™52, also available from DuPont Company, can be used at about 70° C. It is preferable to carry out the polymerization in an appropriate liquid heat exchange medium at a controlled temperature. A suitable liquid heat exchange medium is water, heated to the desired reaction temperature. Commercially available heat transfer fluids may also be used. Additional information concerning thermal polymerization may be found in U.S. Ser. No. 08/234,468, filed Apr. 26, 1994, entitled "Thermal Free-Radical Cure Adhesives and Articles Made Thereby," the contents of which are hereby incorporated by reference.

Polymerization can also be effected by exposure to ultraviolet (UV) radiation as described in U.S. Pat. No. 4,181,752 (Martens et al.). In a preferred embodiment, the polymerization is carried out with UV black lights having over 60 percent, and preferably over 75 percent of their emission spectra between 280 to 400 nanometers (nm), with an intensity between about 0.1 to about 25 mW/cm$^2$.

During photopolymerization it is desirable to control the temperature by blowing cooling air around the packaged pre-adhesive composition, by running the packaged pre-adhesive composition over a cooled platen, or by immersing the packaged pre-adhesive composition in a water bath or a heat transfer fluid during polymerization. Preferably, the packaged pre-adhesive compositions are immersed in a water bath, with water temperatures between about 5° C. and 90° C., preferably below about 30° C. Agitation of the water or fluid helps to avoid hot spots during the reaction.

In a preferred embodiment, after exposing the pre-adhesive composition to transmissive energy and allowing polymerization of the pre-adhesive composition to occur, at least a portion of the pre-adhesive solution has been converted to an adhesive which comprises at least one polymer with a weight average molecular weight of at least 50,000. The weight average molecular weight of the polymerized adhesive composition can range from about 50,000 to about 3,000,000, and preferably from about 100,000 to about 1,800,000, and most preferably from about 200,000 to about 1,500,000.

In a preferred embodiment, the adhesive is a pressure sensitive adhesive at 25° C. In another preferred embodiment, a hot melt coated mixture of the adhesive and the packaging material is a pressure sensitive adhesive at 25° C. and has a storage modulus when measured in torsional shear at 25° C. and at 1 radian/second of between about $10^4$ and about $10^7$ dynes/cm$^2$.

The polymerized adhesives of the invention preferably have a storage modulus (G') when measured in torsional shear at 25° C. and at 1 second (or frequency of 1 radian/second) between about $10^4$ and $10^8$ dynes/cm$^2$ and more preferably between about $10^4$ and $10^7$ dynes/cm$^2$. The storage modulus for a polymerized adhesive having a composition of 90 parts isooctyl acrylate and 10 parts acrylic acid is $1.58 \times 10^6$ dynes/cm$^2$ and for an adhesive having a composition of 98 parts isooctyl acrylate and 2 parts acrylic acid is $2 \times 10^5$ dynes/cm$^2$ as determined by means of a Dynamic Thermal Mechanical Analyzer (DTMA) made by Polymer Laboratories. The instrument subjects the sample to small sinusoidal oscillation in a shear geometry. The shear storage modulus is measured at a frequency of oscillation of 0.1 to 100 Hertz over a temperature range of −100° C. to 150° C. at a heating rate of 2° C. per minute according to ASTM No. D4065-82.

The polymerized adhesives may be used to make a coatable thermoplastic or thermosettable hot melt adhesive by introducing the adhesive and its packaging material into a vessel in which the adhesive and its packaging material are melted. This hot melt adhesive may be used to form a pressure sensitive adhesive sheet by coating the melted adhesive and its packaging material onto a sheet material or another suitable substrate. The sheet material is preferably selected from a tape backing or a release liner. Preferably, the polymerized adhesives are hot melt coated by putting the packaged adhesive in a hot melt coater at a temperature sufficient to melt the packaged adhesive and with sufficient mixing to form a coatable mixture, which is coated onto a substrate. This step can be done conveniently in a heated extruder, bulk tank melter, melt-on-demand equipment, or a hand-held hot melt adhesive gun. If a crosslinking agent is added, the coated adhesive can then be exposed to sufficient UV radiation or ionizing radiation to effect the crosslinking. Crosslinking is preferably initiated after coating.

The steps may be done in-line, i.e., the pre-adhesive composition may be surrounded by the packaging material, polymerized, hot melt coated to form a tape, and optionally crosslinked, or the steps may be performed individually at separate times and sites. For example, the packaged pre-adhesive composition may be polymerized at one time, and extruded and crosslinked at another time.

In one embodiment of the invention, a tape is formed in which the substrate is a tape backing. Typical tape backings include cellulosic materials such as paper, crepe paper, and cloth (including both woven and non-woven cloths); films such as biaxially oriented polyester, polyvinyl chloride, polyurethane, biaxially and monoaxially oriented polypropylene, nylon; foam materials such as polyethylene foams and acrylic foams; and metal foils such as aluminum foil. The backings are usually treated on the back side with a release coating such as silicone, and may be treated prior to hot melt coating to enhance the adhesion of the adhesive to the backing. Treatments useful for enhancing the adhesion of the adhesive to the backing include chemical priming and corona treatment.

In another embodiment of the invention, a transfer tape is formed wherein the substrate is a release liner. The release liner can be coated on one or both sides with a release coating, and the transfer tape is removed from the substrate when used by the end user.

Additionally, the adhesive can be coated on one or both sides of a backing to form a double-coated tape.

In yet another embodiment, the substrate is the surface of a part to be bonded to another part with the hot melt adhesive. In another embodiment of the invention, the adhesive or a tape made out of the adhesive is used to damp vibrations or as a sealant.

In the practice of one embodiment of the invention, two lengths of thermoplastic film are heat sealed together across the bottom and on each of the lateral edges on a liquid form-fill-seal machine to form an open ended pouch. The pre-adhesive composition is pumped through a hose to fill the pouch, and the pouch is then heat sealed across the top to completely surround the adhesive composition.

Preferably, the form-fill-seal machine is equipped with an impulse sealer to form the top and bottom seal across the pouches. Such a sealer has one or two sets of jaws that clamp the pouch shut before sealing. A sealing wire is then heated to effect the seal, and the seal is cooled before the jaws are released. The sealing temperature is generally above the softening point and below the melting point of the film used to form the pouch.

During the sealing process, it is desirable to get most of the air out of the pouch before sealing. A small amount of air is tolerable so long as the amount of oxygen is not sufficient to substantially interfere with the polymerization process. For ease of handling, it is desirable to seal the pouches as soon as they are filled with the composition, although immediate sealing is not necessary in all cases. In some cases the pre-adhesive composition can alter the packaging material, and it is desirable to cross-seal the pouches within about one minute of filling, more preferably within 30 seconds, and most preferably within 15 seconds. If the pre-adhesive composition decreases the strength of the packaging material, it is preferable to polymerize the composition as soon as possible after the pre-adhesive composition is surrounded by the packaging material. For the combination of acrylate monomers with ethylene acrylic acid, ethylene vinyl acetate, or ionomer films, it is preferable to polymerize the composition within about 24 hours of sealing the pouches.

Alternatively, a single length of film can be folded lengthwise and sealed on one edge, filled with the pre-adhesive composition, and sealed. In another embodiment, a single length of film can be pulled through a forming collar, sealed to form a tube, filled with the composition, and sealed. Another embodiment can be carried out on commercial liquid form-fill-seal machines. A source of such machines is the Packaging Machinery Division of Eagle Corp. It is contemplated that the seals can be effected in any of a number of different configurations to form multiple pouches across and down the lengths of film. For example, in addition to the seals on the lateral edges, a seal can also be formed down the center of the lengths of film so that a cross seal will form two filled pouches. The pouches can either be left attached to each other by the cross-seals and/or vertical seals, or they can be cut into individual pouches or strands of pouches. The pouches may each contain the same or different compositions.

The pre-adhesive composition can then be polymerized to form an adhesive within the polymeric pouch by any of the aforementioned methods. The adhesive within the polymeric pouch may be used to damp vibrations. Alternatively, the adhesive itself may be used to damp vibrations.

In another embodiment of the invention, the pre-adhesive composition is continually introduced into a hollow profile of a polymeric film material, continuously exposed to transmissive energy capable of polymerizing said pre-adhesive composition, continuously polymerized to provide a thermoplastic or thermosettable hot melt adhesive, and the polymeric film material and its contents are continuously introduced into a vessel in which the polymeric film material and its contents are melted. The polymeric film material does not substantially adversely affect the adhesive characteristics of a hot melt coated mixture of the adhesive and the polymeric film material. The hot melt adhesive and polymeric film material may be melted, mixed, and coated onto a sheet material to form a pressure sensitive adhesive-coated sheet. The hollow profile of the polymeric film material is the interior of a continuous tube of polymeric film material. The continuous tube is preferably a cylindrical, elliptical, or rectangular continuous tube. In a preferred embodiment the continuous tube is an elliptical continuous tube. In one embodiment of the invention, the tube does not have cross-seals. The hollow profile of the polymeric film material preferably has a cross-sectional area of from about 0.5 cm$^2$ to about 25 cm$^2$, more preferably from about 1 cm$^2$ to about 10 cm$^2$.

In another embodiment of the invention, a pre-adhesive composition is coated onto a carrier web, covered with a sheet material, and polymerized with transmissive energy, wherein the carrier web, the sheet material, or both, are hot melt coatable with the adhesive. If both the carrier web and the sheet material are hot melt coatable, the resulting composite can be fed directly into a hot melt coater, or cut into smaller strips or pieces and fed to the hot melt coater. If only one of the carrier web or the sheet material is hot melt-coatable with the adhesive, the non-coatable entity is removed before the adhesive is hot melt coated. To facilitate handling after the non-coatable entity is removed, the polymerized adhesive can be folded over onto itself so that the coatable entity substantially surrounds the major surfaces of the coated adhesive. The adhesive web can then be fed into a hot melt coater, or it can be cut to smaller strips or pieces before hot melt coating.

If either the carrier web or the sheet material are not coatable with the adhesive (e.g., as in the case of Type II compositions, described below), it should be treated, if necessary, so that the adhesive can be removed easily from it. Such treatments include silicone release coatings, polyfluoropolyether coatings, and polyfluoroethylene coatings such as Teflon™.

The carrier web should provide sufficient strength to support the coated pre-adhesive composition during polymerization, or it can be supported by a platen during polymerization. The carrier web can be an endless conveyor belt, or it can be a flexible material which can be wound into a roll with the adhesive; the carrier web is itself a sheet material. Endless conveyor belts can be made from silicone elastomers; polymeric films such as those made from polyfluoroethylene, polyester, nylon, polycarbonate, and the like; metals such as stainless steel; rubber; glass fibers; and the like. Useful flexible materials include paper and polymeric films such as those made from polyester, nylon, polycarbonates, polyolefins, ethylene acrylic acid, ethylene vinyl acetate, ionomers, and the like. Coatable flexible materials include polyolefins such as polypropylene, polyethylene, and polybutadiene; ethylene acrylic acid; ethylene vinyl acetate; and ionomers.

Likewise, the sheet material can be made from the aforementioned flexible materials as well as non-flexible plates made of glass, polymers, or metals, which may optionally be coated with a release material. If the pre-adhesive composition is to be photopolymerized, the carrier web, the sheet material, or both should be sufficiently transparent to actinic radiation to effect polymerization.

In another embodiment of the invention, the pre-adhesive composition is coated onto a carrier web and polymerized with transmissive energy; the coated pre-adhesive is not covered with a sheet material. The carrier web is coatable with the adhesive. In a preferred embodiment, when the coated pre-adhesive is not covered with a sheet material, the polymerization is conducted in an inert atmosphere.

The invention also provides a packaged, thermoplastic or thermosettable hot melt pre-adhesive comprising a pre-adhesive composition substantially or completely surrounded by a packaging material; the pre-adhesive composition has a viscosity of less than 50,000 centipoise at 25° C. and capable of polymerizing in the presence of transmissive energy to provide a thermoplastic or thermosettable hot melt adhesive. Preferably, the packaging material does not substantially adversely affect the adhesive properties of a hot melt coated mixture of the packaging material and an adhesive produced from polymerization of the pre-adhesive composition, and a hot melt coated mixture of the adhesive and the packaging material preferably has a storage modulus when measured in torsional shear at 25° C. and at 1 radian/second of between about $10^4$ and about $10^8$ dynes/cm$^2$. The adhesive is obtainable from the pre-adhesive composition by:

(a) exposing the pre-adhesive composition to transmissive energy capable of polymerizing the pre-adhesive composition; and (b) allowing polymerization of the pre-adhesive composition to occur to provide the thermoplastic or thermosettable hot melt adhesive.

In another preferred embodiment of the packaged pre-adhesive, the pre-adhesive composition has a viscosity of less than 5,000 centipoise at 25° C.; in another embodiment the pre-adhesive composition has a viscosity of less than 50 centipoise at 25° C. The packaging material is preferably a flexible thermoplastic polymeric film. The packaging material is preferably selected from ethylene-vinyl acetate, ethylene-acrylic acid, polypropylene, polyethylene, polybutadiene, or ionomeric films.

In another embodiment of the packaged pre-adhesive, the pre-adhesive composition comprises:
(a) 50 to 100 parts by weight of a polymerizable component comprising at least one acrylic or methacrylic ester of a non-tertiary alkyl alcohol in which the alkyl group contains 1 to 20 (e.g., 3 to 18) carbon atoms;
(b) 0 to 50 parts by weight of a polymerizable component comprising at least one modifying monomer, other than said acrylic or methacrylic ester, copolymerizable with component (a), the sum of (a) and (b) amounting to 100 parts by weight;
(c) an effective amount of a polymerization initiator; and
(d) an effective amount of a chain transfer agent.

In addition to the above-described applications, the packaged adhesives are useful in other areas. For example, the above-described method can be used to prepare self-stick articles useful, e.g., as labels, stickers, body-side moldings, decorative moldings, electrical tapes, drug-delivery patches, mechanical fasteners (e.g., SCOTCHMATE™ brand hook and loop fasteners and DUAL LOCK™ brand reclosable fasteners sold by 3M Co. of St. Paul, Minn.), abrasive articles (e.g., grinding disks), form-in-place gaskets, medical tapes, canvas marking films, and decorative sheeting, and by disposing the pre-adhesive composition between a substrate sheet and a releasable liner, polymerizing the composition, and then removing the liner.

The packaged adhesives can also be used on sheet products such as retroreflective sheetings (e.g., microsphere-based retroreflective sheetings and cube corner type sheetings) and graphic sheetings. Illustrative examples of retroreflective sheetings on which adhesives of the invention can be used include exposed-lens retroreflective sheetings, embedded-lens sheetings, and encapsulated-lens sheetings. Illustrative examples of commercially available retroreflective sheetings suitable for use include the SCOTCHLITE Brand Engineer Grade, High Intensity Grade, and Diamond Grade Retroreflective Sheetings sold by 3M of St. Paul, Minn. Upon selection of suitable embodiments of the adhesive, these sheetings can be applied to a variety of desired substrates such as license plate blanks, vehicle bodies, sign faces, guard rails, pavement surfaces, vehicle bodies, traffic cones, barriers, clothing, and markers, etc. Illustrative examples of commercially available graphic sheetings suitable for use include SCOTCHCAL Brand Vinyl Films and Polyester Films from 3M of St. Paul, Minn.

Test Procedures-Type I Compositions
MOLECULAR WEIGHT

The molecular weight of the polymer is determined (before hot melt coating and cross linking) by conventional gel permeation chromatography. The instrumentation includes a Hewlett-Packard Model 1090 chromatograph, a Hewlett-Packard Model 1047A Refractive Index detector, and a variable wavelength UV detector set at 254 nanometers. The chromatograph was equipped with a mixed bed pore size from Jordi Associates and a W-100 Angstrom column from Waters Associates, or two 20 micron bed columns (PL Gel) from Polymer Labs. The system was calibrated with Polystyrene standards from Pressure Chemical Co. The signal was converted to digital response using Nelson Analytical hardware and software, and molecular weights (weight average and number average) and polydispersity were determined on a Hewlett-Packard Model 9000/200 computer. The weight-average molecular weight (MW) and the polydispersity (P) were calculated according to accepted practices. The polydispersity is calculated by dividing the weight-average molecular weight by the number-average molecular weight. GPC test methods are further explained in "Modern Size Exclusion Liquid Chromatography: *Practice of Gel Permeation Chromatography*," John Wiley and Sons, 1979.

The samples were prepared by pre-treating with diazomethane in diethyl ether. After drying, the samples were dissolved in tetrahydrofuran (THF) at a concentration of 1.5 milligrams per milliliter of THF, and filtered through a 0.2 micrometer Teflon™ filter. Samples were injected into the columns at volumes of 50 micro-liters and eluted at a rate of 1 ml per minute through columns maintained at about 21° C.

90° PEEL ADHESION

One of the liners is removed from a strip of pressure sensitive adhesive transfer tape measuring 12.7 cm by 1.27 cm, and laminated to a 0.0508 mm (2 mil) thick aluminum foil. The other liner is then removed and the tape is adhered to a 5.08 cm by 12.7 cm stainless steel panel that had been wiped clean once with acetone and wiped twice with heptane. The tape is rolled down with one pass of a 2.05 kg hard rubber roller. The panel is conditioned at room temperature (about 21° C.) for about 15 minutes for the initial peel adhesion (INIT) or 72 hours for aged peel adhesion (AGED), then mounted on a peel tester such that the tape is pulled off at a 90° angle at a speed of 30.5 cm per minute. The results are reported in the tables in Newtons per decimeter (N/dm), and the values are an average of two tests.

STATIC SHEAR

Static shear is determined by laminating the pressure sensitive adhesive transfer tape to a 0.0508 mm thick piece of aluminum foil and cutting to a dimension of 12.7 cm by 1.27 cm. One end of the sample is adhered to a stainless steel panel, previously cleaned as described above, with a 2.54 cm overlap, and a weight is attached to the other end of the sample. The panel is then hung at about a 2° tilt from the vertical, to assure a shear mode failure, and the time in which the sample pulls away from the panel is measured in minutes (min). The test is discontinued after 10,000 minutes. A 1000 gram weight is used for the room temperature shear (RT). The elevated temperature shear is conducted by hanging one set of samples in a 70° C. oven using a 500 gram weight (500 g), and by hanging a second set using a 1000 gram weight (1000 g). The reported values represent the average value of two tests per set.

HEAT SEALABLE FILMS

Film A—A heat sealable 0.0254 mm (1 mil) thick biaxially oriented polypropylene film was prepared by heating one surface of the film over a heated Teflon™ polymer (DuPont 958-203) coated roller that had been polished to a 0.8–1.3 micrometer, Ra, at a speed of 23 meters per minute. The roller surface was heated to a surface temperature of 260° C. The web contacted 2–4 millimeters of the roll surface. The film had a surface finish of about 1.4 micrometers Ra with 41 peaks per centimeter. The surface was measured using a Surtronic 3 Profilometer (from Taylor-Hossen, Leicester, England) using a #1502 stylus, long stroke, and 50 bandwidth. The first noted bond strength (T-peel, ASTM D1876-72) was noted at 149° C. and was about 1.5 kg/cm. Preparation of the film is disclosed in co-pending application U.S. Ser. No. 08/047,807 (Hyde), incorporated herein by reference.

Film B—A heat sealable 0.0635 mm (2.5 mil) thick ethylene vinyl acetate film having 6% vinyl acetate (VA24- from Consolidated Thermoplastics Co. of Schaumburg, Ill.).

Film C—A heat sealable 0.0635 mm (2.5 mil) thick ethylene acrylic acid film (EA90, also designated PL50 from Consolidated Thermoplastics Co.).

Film D—A heat sealable 0.057 mm (2.25 mil) thick ethylene acrylic acid film (EA90, also designated PL50 from Consolidated Thermoplastics Co.).

EXAMPLES-TYPE I COMPOSITIONS

Example 1

Two sheets of Film A were heat sealed on the lateral edges and the bottom to form a rectangular pouch measuring 3.175 cm (1.25 inches) wide on a liquid form, fill, and seal machine. The pouch was then filled with a pressure sensitive adhesive composition having 90 parts isooctyl acrylate (IOA), 10 parts acrylic acid (AA), 0.25 part of benzil dimethyl ketal photoinitiator (Irgacure™651 from Ciba Geigy) per 100 parts of total monomer ("PHR"), 0.05 PHR carbon tetrabromide ($CBr_4$), and 0.1 PHR para-acryloxybenzophenone. The filled package was then heat sealed at the top in the cross direction through the monomer to form individual pouches measuring 3.175 cm by 3.175 cm by about 0.356 cm thick containing 1.9 grams of composition.

The pouches were placed in a water bath that was maintained between about 21° C. and 32° C. and exposed to ultraviolet radiation at an intensity of about 2 mW/cm2 for 8.33 minutes (UV Exp Time). The radiation was supplied from lamps having about 90% of the emissions between 300 and 400 nanometers (nm), and a peak emission at 351 nm. The molecular weight ($M_w$) and polydispersity (P) of the adhesive are shown in Table 1.

The pouches were then fed to a single screw extruder (Haake) with barrel temperatures set at about 177° C. and die temperatures set at about 177° C. The pressure sensitive adhesive was extruded to a thickness of 0.0508 mm onto a paper web that was treated on both sides with a silicone release coating. The coated adhesive was then exposed to a medium pressure mercury vapor lamp having an output of about 80 watts per cm and a spectral output over a range of 180 to 430 nm to provide a total energy of 100 mJ/cm2. The pressure sensitive adhesive was then tested according to the above described test procedures for peel adhesion and static shear. Test results are shown in Table 1.

Examples 2–5

Pressure sensitive adhesive tapes were prepared and tested as for Example 1 except for the changes in composition and exposure times as shown in Table 1 and as follows:

Example 3 contained 2.3 grams of adhesive composition.

Example 4 was prepared by mixing the adhesive composition and exposing to UV radiation as described above to form a pre-adhesive composition having a viscosity of about 3000 centipoise. The pre-adhesive composition was then used to fill the pouches (approximately 2.2 grams/pouch).

Example 5 included 1.0 part antioxidant (Irganox™1076 from Ciba Geigy) and the pouches contained 2.3 grams of adhesive composition.

TABLE 1

| Ex | *PI (PHR) | $CBr_4$ (PHR) | UV Exp Time (min) | Cross-linking Energy (mJ/cm²) | $M_w$ | P | 90° Peel Adhesion (N/dm) RT | AGED | Static Shear (minutes) RT | 70° C. 500 g | 70° C. 1000 g |
|---|---|---|---|---|---|---|---|---|---|---|---|
| 1 | 0.25 | 0.050 | 8.33 | 100 | 859000 | 3.13 | 25.4 | 31.9 | 10000 | 10000 | 5765 |
| 2 | 0.25 | 0.150 | 4.80 | 200 | 404000 | 2.85 | 27.5 | 42.0 | 10000 | 10000 | 4360.5 |
| 3 | 0.50 | 0.050 | 4.80 | 300 | 822000 | 2.82 | 18.2 | 40.8 | 10000 | 10000 | 476.5 |
| 4 | 0.50 | 0.050 | 6.25 | 100 | 745000 | 4.28 | 22.2 | 47.8 | 10000 | 36.5 | 687.5 |
| 5 | 0.25 | 0.100 | 6.25 | 100 | 527000 | 3.14 | 21.9 | 27.8 | 10000 | 10000 | 58 |

*PI (PHR) - Photoinitiator amount in parts per 100 parts of acrylate monomer and co-polymerizable monomer (PHR).

The data in Table 1 show that pressure sensitive adhesives having good adhesive properties can be made by the method of the invention.

The adhesive compositions of Examples 1–5 were polymerized as described above using three different cooling methods: blowing compressed air over the pouches on a metal platen chilled to −3.9° C., blowing nitrogen over the pouches on a metal platen chilled to −3.9° C., and immersing the pouches in a water bath as described above, while keeping the UV exposure time constant at 8.33 minutes. The molecular weights and polydispersities were determined and are shown in TABLE 2.

TABLE 2

| | Nitrogen Cooling | | Air Cooling | | Water Bath | |
|---|---|---|---|---|---|---|
| EX | $M_w$ | P | $M_w$ | P | $M_w$ | P |
| 6 | 467,000 | 4.69 | 336,000 | 7.23 | 728,000 | 3.75 |
| 7 | 477,000 | 7.38 | 354,000 | 7.50 | 421,000 | 3.11 |
| 8 | 352,000 | 10.26 | 403,000 | 8.04 | 811,090 | 3.10 |
| 9 | 641,000 | 7.61 | 751,000 | 4.55 | 973,000 | 2.55 |
| 10 | 426,000 | 8.62 | 453,000 | 9.30 | 593,000 | 3.43 |

The results in TABLE 2 show that the polydispersity can be varied depending upon the cooling method used, and water bath cooling is preferred when a lower polydispersity value is desired.

Examples 11–30

Examples 11–30 show various combinations of adhesive compositions and processing conditions to change the properties of the adhesive. Pressure sensitive adhesive tapes were prepared and tested as for Example 1 except for the changes in composition and exposure times as shown in Table 3 and as follows:

Examples 11–13—Film B was used to form pouches measuring 4.06 cm by 3.81 cm by 0.66 cm thick. The pouches contained 6.6 grams of pre-adhesive composition. The water bath temperature was about 25° C.

Examples 14–15—Film C was used to make pouches measuring 3.18 cm long by 3.18 cm wide by about 0.36 cm thick and containing 2.4 grams and 2.7 grams of composition, respectively.

Examples 16–17—Film C was used to make pouches measuring 4.06 cm by 3.56 cm by 0.51 cm and containing 4.5 grams of pre-adhesive composition.

Examples 18–19—Film C was used to make pouches measuring 4.06 cm by 3.56 cm by 0.51 cm containing 5.1 grams of pre-adhesive composition. The monomer composition was changed to 96 parts IOA and 4 parts AA.

Examples 20–22—Film D was used to make pouches measuring 4.06 cm by 3.81 cm. Example 20 was 0.61 cm thick and contained 6.8 grams of pre-adhesive composition. Examples 21–22 were 0.64 cm thick and contained 6.6 grams of pre-adhesive composition.

Examples 23–25—Film C was used to form filled pouches measuring 4.06 cm by 3.81 cm by 0.64 cm thick. The pouches of Example 23 contained 7.2 grams of a composition having 92 parts IOA and 8 parts AA. Pouches of Example 24 contained 6.9 grams of a composition having 94 parts IOA and 6 parts AA. Pouches of Example 25 contained 7.0 parts of a composition having 96 parts IOA and 4 parts AA.

Examples 26–28—Film C was used to form filled pouches measuring 4.06 cm by 3.81 cm by 0.58 cm thick and containing 6.7 grams of a composition having 98 parts IOA and 2 parts AA.

Examples 29–30—Film C was used to form filled pouches measuring 4.06 cm by 3.81 cm by 0.61 cm and containing 6.4 grams of a composition having 90 parts IOA and 10 parts AA.

with electron beam energy at various doses shown in TABLE 4. Test results for peel adhesion and static shear are shown in TABLE 4.

TABLE 4

| Dose (MRAD)* | RT Peel Adhesion (N/dm) | Static Shear (min)** |
|---|---|---|
| 0 | 27.4 | 0 |
| 3 | 19.7 | 515 |
| 5 | 17.5 | 581 |
| 7 | 15.3 | 963 |
| 9 | 16.4 | 11 |

*Electron beam dose shown in Megarads
**Static shear conducted at 65° C. with 500 gram weight, and 1.27 cm wide sample with a 1.27 cm overlap on panel The data in TABLE 4 show that the pressure sensitive adhesive can be crosslinked by electron beam radiation to provide useful pressure sensitive adhesives.

Example 31

A pouch measuring 6.86 by 3.30 cm was prepared by heat sealing three edges of Film A. The pouch was filled with 10 grams of a pre-adhesive composition having 90 parts IOA, 10 parts AA, and 0.3 PHR VAZO™64 initiator. Most of the air was squeezed out and the fourth edge was sealed. The pouch was placed in a pail filled with 60.5° C. tap water and a length of mesh with weights attached to each end was placed over the pouch to keep the pouch submerged. The pouch was held in the water for 3 hours and 54 minutes during which time incoming water was added to keep the water temperature at about 60° C. An increase in viscosity and the formation of some gas bubbles in the pouch were observed. The final water temperature was 59.5° C. The composition had polymerized to a tacky pressure sensitive adhesive state having no visible gels. This composition can be coated as a hot melt adhesive.

TABLE 3

| Ex | *PI (PHR) | CBr$_4$ (PHR) | UV Exp Time (min) | Cross-linking Energy (mJ/cm$^2$) | $M_w$ | P | 90° Peel Adhesion (N/dm) RT | AGED | Static Shear (minutes) 70° C. RT | 70° C. 500 g | 1000 g |
|---|---|---|---|---|---|---|---|---|---|---|---|
| 11 | 0.50 | 0.050 | 12.10 | 100 | 1130000 | 4.79 | 34.9 | 52.4 | 10000 | 10000 | 269 |
| 12 | 0.50 | 0.050 | 12.10 | 200 | 1130000 | 4.79 | 29.5 | 51.3 | 10000 | 10000 | 10000 |
| 13 | 0.50 | 0.050 | 12.10 | 300 | 1130000 | 4.79 | 27.1 | 46.5 | 10000 | 10000 | 10000 |
| 14 | 0.50 | 0.075 | 9.50 | 100 | 846000 | 5.71 | 21.3 | 53.5 | 3557.5 | 106.5 | 13.5 |
| 15 | 0.50 | 0.075 | 8.00 | 200 | 882000 | 6.01 | 26.0 | 42.0 | 8528 | 10000 | 50 |
| 16 | 0.50 | 0.025 | 9.33 | 100 | 2560000 | 6.34 | 28.1 | 48.0 | 10000 | 10000 | 10000 |
| 17 | 0.50 | 0.025 | 9.33 | 300 | 2560000 | 6.34 | 28.3 | 38.7 | 7689.5 | 10000 | 651 |
| 18 | 0.50 | 0.075 | 9.33 | 100 | 591000 | 3.76 | 23.9 | 26.9 | 10 | 1 | 0 |
| 19 | 0.50 | 0.075 | 9.33 | 300 | 591000 | 3.76 | 19.3 | 25.3 | 37 | 2.5 | 7.5 |
| 20 | 0.50 | 0.050 | 12.10 | 300 | 1050000 | 5.27 | 38.5 | 55.1 | 10000 | 10000 | 10000 |
| 21 | 0.50 | 0.050 | 12.10 | 100 | 1110000 | 4.69 | 35.6 | 54.5 | 5257 | 593 | 31.5 |
| 22 | 0.50 | 0.050 | 12.10 | 300 | 1110000 | 4.69 | 28.2 | 47.5 | 10000 | 10000 | 10000 |
| 23 | 0.25 | 0 | 8.80 | 100 | 1670000 | 8.52 | 20.0 | 33.9 | 10000 | 10000 | 10000 |
| 24 | 0.25 | 0 | 8.80 | 100 | 1850000 | 8.77 | 24.1 | 32.8 | 7197 | 10000 | 43.5 |
| 25 | 0.25 | 0 | 8.80 | 100 | 1940000 | 8.64 | 20.0 | 28.5 | 925.5 | 10000 | 129.5 |
| 26 | 0.25 | 0 | 8.80 | 100 | 1810000 | 8.8 | 19.3 | 25.7 | 1242 | 10000 | 20 |
| 27 | 0.25 | 0 | 8.80 | 200 | 1810000 | 8.8 | 18.8 | 17.5 | 111.5 | 479.5 | 2016 |
| 28 | 0.25 | 0 | 8.80 | 300 | 1810000 | 8.8 | 14.3 | 16.1 | 55 | 10000 | 4.5 |
| 29 | 0.25 | 0.050 | 8.80 | 100 | 1460000 | 5.81 | 34.1 | 43.9 | 10000 | 10000 | 10000 |
| 30 | 0.25 | 0.050 | 8.80 | 300 | 1460000 | 5.81 | 25.1 | 43.3 | 10000 | 10000 | 10000 |

A hot melt coated pressure sensitive adhesive was prepared as in Example 26. The adhesive was then cross-linked

Example 32

Two sheets of Film C (0.0635 mm thick film of ethylene acrylic acid) were heat sealed on the lateral edges to form a continuous tube (measuring 3.810 cm wide when flattened) on a liquid form, fill, and seal machine. The tube was then continuously filled with a pressure sensitive adhesive composition having 90 parts isooctyl acrylate (IOA), 10 parts acrylic acid (AA), 0.75 part of benzil dimethyl ketal photoinitiator (Irgacure™651 from Ciba Geigy), 0.075 part carbon tetrabromide, and 0.1 part para-acryloxybenzophenone. The fill rate was about 1.7 grams of composition per cm length of tube, and the filled tube was 0.635 cm thick. The filled tube with no cross-seals was then pulled through a water bath having a temperature of about 23° C. and polymerized with ultraviolet radiation on a continuous basis such that the tube contained monomer as it entered the water bath under the UV lamps, and the tube contained a pressure sensitive adhesive as it was removed from underneath the lamps. The tube was exposed to ultraviolet radiation at an intensity of about 2 mW/cm$^2$ for 9 minutes and 25 seconds to polymerize the entire length of the tube. The radiation was supplied from lamps having about 90% of the emissions between 300 and 400 nanometers (nm), and a peak emission at 351 nm. The tube, measuring about 15 meters, contained a tacky pressure sensitive adhesive having no visible gels. The tube and its contents can be hot melt coated.

Example 33

Pouches were prepared as in Example 1 and filled with a series of hot melt coatable acrylate pressure sensitive adhesive compositions. In the first pair, one composition (A-1) contained 93 parts iso-octyl acrylate, 7 parts acrylic acid, 0.60 parts Irgacure 651 initiator, 0.04 parts CBr$_4$ chain transfer agent, and 0.10% by weight 4-acryloyl-oxy-benzophenone (ABP), while its counterpart composition (A-2) was identical to the first composition except that it contained no ABP. The pouches were made from EA90 ethylene acrylic acid film, and were 2 inches (5 cm) wide.

The pouches containing composition A-1 were exposed to an energy of 744.3 mJ/cm$^2$ for 8 minutes, 42 seconds. The weight of 20 pouches was 243.4 grams; the length of 20 pouches was 42.75 inches (107.3 cm); the thickness of 20 pouches stacked on top of each other was 5.375 inches. The polymerized adhesive in the pouches had a weight average molecular weight of 780,000 and a polydispersity of 3.21. Molecular weight was determined as described above except using an ASI Permaged 10 micron particle size column.

The pouches containing composition A-2 were exposed to an energy of 773.6 mJ/cm$^2$ for 8 minutes, 44 seconds. The weight of 20 pouches was 242.3 grams; the length of 20 pouches was 42.375 inches; the thickness of a stack of 20 pouches was 5.625 inches. The adhesive had a molecular weight of 594,000 and a polydispersity of 2.46.

The remaining series of compositions were prepared in a similar manner with the following compositions.

In the second pair, one composition (B-1) contained 93 parts iso-octyl acrylate, 7 parts acrylic acid, 0.60 parts Irgacure 651 initiator, 0.01 parts CBr$_4$ chain transfer agent, and 0.10% by weight 4-acryloyl-oxy-benzophenone (ABP), while its counterpart composition (B-2) was identical to the first composition except that it contained no ABP.

In the third pair, one composition (C-1) contained 93 parts iso-octyl acrylate, 7 parts acrylic acid, 0.20 parts Irgacure 651 initiator, 0.01 parts CBr$_4$ chain transfer agent, and 0.10% by weight 4-acryloyl-oxy-benzophenone (ABP), while its counterpart composition (C-2) was identical to the first composition except that it contained no ABP.

In the fourth pair, one composition (D-1) contained 93 parts iso-octyl acrylate, 7 parts acrylic acid, 0.15 parts Irgacure 651 initiator, 0.01 parts isooctylthioglycolate chain transfer agent, and 0.10% by weight 4-acryloyl-oxy-benzophenone (ABP), while its counterpart composition (D-2) was identical to the first composition except that it contained no ABP.

Each composition was hot melt coated to form a coating approximately 5 mils thick, which was then crosslinked by exposure to electron beam radiation at 300 kV (Compositions A-1, A-2, B-1, B-2, C-1, and C-2) or 240 kV (Compositions D-1 and D-2) and various dosages. The gel fraction of each composition at each dosage was measured. The results are shown below in Table 5. The results demonstrate that the ABP-containing compositions exhibited a higher gel fraction for a given electron beam dosage compared to the compositions without ABP.

TABLE 5

| Composition | Gel Fraction Dose-Mrad | | | |
|---|---|---|---|---|
| | 1 | 2 | 3 | 4 |
| A-1 | 37 | 58 | 70 | 77 |
| A-2 | 11 | 39 | 62 | 68 |
| B-1 | 70 | 77 | 81 | 84 |
| B-2 | 67 | 72 | 77 | 80 |
| C-1 | 79 | 84 | 87 | 88 |
| C-2 | 72 | 79 | 83 | 86 |
| D-1 | 58 | 59* | 69 | 71 |
| D-2 | 38 | 50* | 60 | 68 |

*Dose was 1.5 Megarads

Type II Compositions

In the Type II compositions, the packaging material is removed after polymerization so that any further processing, e.g., melting, coating, or simply application of the adhesive, involves only the adhesive. The adhesive and pre-adhesive compositions described above in the case of the Type I compositions are equally suitable for the Type II compositions, as are the polymerization processes and conditions used to prepare the adhesive. The packaging materials described in connection with the Type I compositions are also suitable. However, because the packaging material is removed before any post-polymerization processing, the choice of packaging material is not limited to materials that will not substantially affect the adhesive properties of the final product when melted together. Thus, a wide variety of packaging material may be used, with materials permitting ready removal from the adhesive being preferred.

To enhance the ability to remove the adhesive from the packaging material, the packaging material may be provided with a release material.

Examples of applications in which the packaging material is removed prior to post-polymerization processing include moisture-curable sealant compositions. These compositions would be prepared in the form of a sealed pouch which is stripped to permit application of the sealant composition. Other examples include optically clear adhesives.

Test Procedures-Type II Compositions

Test tapes were prepared using hot melt adhesive compositions according to the Examples coated onto a release layer by transferring the sample to an Aluminum foil backing layer having a thickness of about 50 micrometers to provide the tape to be tested. Each tape was slit to a width of 1.27 cm. The tapes were tested for Peel Value and Shear Value as indicated below.

90 DEGREE PEEL VALUE

Tape is adhered by its adhesive to a stainless steel plate under the weight of a 2 kg. hard rubber roller. Peelback at 90 degrees is measured by attaching the free end of the tape to a scale and moving the steel plate away from the scale at a rate of about 3.8 cm per second. The samples are subjected to either a 20 minute dwell time at room temperature (RT) or a 20 minute dwell time followed by 72 hours at RT. All samples are tested at RT. The test data is measured in oz./½ inch width and converted to Newtons/decimeter (N/dm).

SHEAR VALUE

A strip of tape is adhered by its adhesive to a stainless steel plate under the weight of a 2 kg. hard rubber roller with a free end of the tape extending beyond the plate and the adhesive contact area being 1.27 cm by 2.54 cm. After 30 minutes, the plate is placed either at room temperature or in an oven at 70° C. and positioned 2 degrees from the vertical to prevent peeling. After 10 minutes, samples at room temperature have a 1000 g mass suspended from the free end and samples at 70° C. have either a 500 g. or a 1000 g.mass suspended from the free end, and continue to test at room temperature and at 70° C. The time at which the mass falls is noted. The test is discontinued if the tape has not failed after 10,000 minutes.

MOLECULAR WEIGHT AND POLYDISPERSITY

The weight-average molecular weight (MW) and the polydispersity (P) of the polymer (before hot melt coating and crosslinking) are determined according to the test procedure outlined for the the Type I compositions.

Examples 34–36

These examples describe the preparation of a hot melt adhesive composition wherein the amount and type of chain transfer agent were varied.

The examples were prepared according to the following general preparation. A partially polymerized pre-adhesive composition was prepared by mixing 90 parts of IOA, 10 parts of AA, 0.15% KB-1, and all of the chain transfer agent (Example 34) or part of the chain transfer agent (Examples 35 and 36). The mixture was placed in a container and stirred while nitrogen gas was bubbled through the mixture to exclude oxygen. The mixture was irradiated with low intensity ultraviolet light until a viscous partially polymerized pre-adhesive composition was obtained.

To the partially polymerized pre-adhesive composition, 0.35% KB-1, 0.10% ABP, and the remainder of the chain transfer agent (Examples 35 and 36) were added and the composition was stirred to insure complete mixing of components.

The composition was knife coated at a thickness of about 2.5 mm (100 mils) between two sheets of 0.05 mm thick (2 mils) uv-transparent polyester coated with a silicone release layer. The coated sandwich was passed through two irradiation zones where a total of 750 millijoules/cm$^2$ of energy was expended. Zone 1 was at approximately 112.5 millijoules/cm$^2$ of energy at a light intensity of 0.8 milliwatts/cm$^2$. Zone 2 was at an energy of approximately 637.5 millijoules/cm$^2$ at a light intensity of 2.0 milliwatts/cm$^2$. During irradiation, the coated sandwich was cooled by air impingement to remove the heat of polymerization. After passing through the two exposure zones, the polyester sheets were removed from the sandwich, the composition was placed in a hot melt coater/extruder and heated to about 177° C. The melted composition was then coated at a thickness of about 0.05 mm (2 mils) onto a silicone coated release liner. The linerless side/surface was exposed to medium pressure mercury arc lamps and the hot melt adhesive composition was crosslinked. The tape samples were prepared and tested according to the above test methods for Peel and Shear Adhesion.

The chain-transfer agents (CTA) and their amounts used, the post crosslink energy, Peel and Shear adhesion are given in Table 6 below.

TABLE 6

| Ex. No. | CTA | % CTA Added to Monomer | % CTA Added to Syrup | Post Xlink Energy (mJ) | Peel Adhesion (N/dm) Initial | Peel Adhesion (N/dm) 72 hours | Shear Adhesion (minutes) RT | Shear Adhesion (minutes) 70° C. |
|---|---|---|---|---|---|---|---|---|
| 34 | CBr4 | 0.025 | 0.000 | 100 | 48 | 105 | 10000 | 10000 |
| 35 | CBr4 | 0.025 | 0.025 | 100 | 54 | 119 | 10000 | 10000 |
| 36 | CBr4 | 0.025 | 0.050 | 200 | 60 | 110 | 10000 | 10000 |

EXAMPLES-TYPE II COMPOSITIONS

GLOSSARY

| | |
|---|---|
| IOA | isooctyl acrylate |
| AA | acrylic acid |
| KB-1 | 2,2-dimethoxy-1,2-diphenyl-1-ethanone (available from Sartomer Co. under the trade designation "Escacure KB-1") |
| CBr4 | carbon tetrabromide |
| BBP | 1,5-Bis(4-benzoylbenzoxy)pentane |
| ABP | acryloxybenzophenone |
| BP | benzophenone |
| IOTG | Isooctylthioglycolate |
| VP | $CH_2$=CH—CONH—C(CH$_3$)$_2$—COOCH$_2$CH$_2$O—PHENYL—COC(CH$_3$)$_2$OH |
| SP553 | Terpene phenolic resin (available from Schenectady International, Inc.) |

Examples 37–40

These examples describe the preparation of hot melt adhesive compositions wherein the amount and type of crosslinking agent were varied.

The samples were prepared as in example 34 using a total amount of CBr4 of 0.025% by weight as the CTA component added to the monomers with the exception that a total amount of 0.50% KB-1 was added in 1 portion to the monomers.

The coated samples were evaluated for peel and shear adhesion according to the test methods outlined hereinabove. The crosslinking agents (CLA) and their amounts used, post crosslink energy, Peel and Shear adhesion are given in Table 7 below.

TABLE 7

| Ex. No. | CLA | % CLA Added | Post Xlink Energy (mJ) | Peel Adhesion (N/dm) Initial | Peel Adhesion (N/dm) 72 hours | Shear Adhesion (minutes) RT | Shear Adhesion (minutes) 70° C. |
|---|---|---|---|---|---|---|---|
| 37 | ABP | 0.10 | 100 | 52 | 54 | 10000 | 10000 |
| 38 | ABP | 0.20 | 100 | 53 | 55 | 10000 | 10000 |
| 39 | VP | 0.40 | 200 | 62 | 79 | NT | 10000* |
| 40 | BP | 0.60 | 200 | 59 | 90 | NT | 10000* |

*500 gram shears

Examples 41–44

These examples describe the preparation of hot melt adhesive compositions the amount of crosslinking agent and chain transfer agent were varied.

The samples were prepared according to examples 37–40 using varying amounts of CBr4 and ABP.

The coated samples were evaluated for peel and shear adhesion according to the test methods outlined hereinabove. The amounts of chain transfer agent (CBr4) and crosslinking agent (ABP) used, post crosslink energy, Peel and Shear adhesion are given in Table 8 below.

TABLE 8

| Ex. No. | % CBr4 Added | % ABP Added | Post Xlink Energy (mJ/cm²) | Peel Adhesion (N/dm) Initial | Peel Adhesion (N/dm) 72 hours | Shear Adhesion (min.) RT | Shear Adhesion (min.) 70° C. |
|---|---|---|---|---|---|---|---|
| 41 | 0.075 | 0.10 | 200 | 48 | 95 | 10000 | 10000 |
| 42 | 0.075 | 0.20 | 200 | 54 | 66 | 10000 | 5326 |
| 43 | 0.050 | 0.10 | 100 | 52 | 62 | 10000 | 10000 |
| 44 | 0.050 | 0.15 | 100 | 51 | 59 | 10000 | 10000 |

Examples 45–46

These examples describe the preparation of tape samples from a composition containing a tackifier.

The hot melt adhesive composition was prepared according to Examples 34–36 using a total amount of CBr4 of 0.025% by weight as the CTA component added as in Example 34 to the monomer and 96 parts of IOA and 4 parts of AA in place of 90 parts IOA and 10 parts AA. The tackifier was added to the extruder along with the hot melt adhesive composition. 100 millijoules of energy per cm² was used to post crosslink the coated composition. Example 45 contained no tackifier (SP553) and Example 46 contained 20% by weight of tackifier (SP553) based on 100 parts of adhesive composition.

The coated samples were evaluated for Peel and Shear adhesion according to the test methods outlined hereinabove. The Peel and Shear adhesion are given in Table 9 below.

TABLE 9

| Ex. No. | Peel Adhesion (N/dm) Initial | Peel Adhesion (N/dm) 72 hours | Shear Adhesion (minutes) RT | Shear Adhesion (minutes) 70° C. |
|---|---|---|---|---|
| 45 | 41 | 51 | 4853* | 770* |
| 46 | 88 | 90 | 62* | 3* |

*500 g. shears

Examples 47–49

These examples describe the preparation and testing of tape samples featuring a hot melt adhesive composition with and without a packaging material that is hot melt-coatable.

The hot melt adhesive composition was prepared as described in Example 35 except that 0.125% of ABP was used, the post crosslink energy was 200 mJ for Examples 47–48 and 150 mJ for Example 49, and before the composition was placed in a hot melt extruder, a hot melt coatable packaging film (Ethylene Acrylic Acid containing about 9% AA commercially available as PL-50 from Consolidated Thermoplastics Company, Schaumburg, Ill. of 0.05 mm thickness was laminated to the coated composition for Examples 47 and 49. Example 48 did not have a packaging film laminated to it.

The tape samples were prepared and tested according to the test methods for Peel and Shear Adhesion and the results are given in Table 10 below.

TABLE 10

| Ex. No. | Post Xlink Energy (mJ) | Peel Adhesion (N/dm) Initial | Peel Adhesion (N/dm) 72 hours | Shear Adhesion (minutes) 70° C. |
|---|---|---|---|---|
| 47 | 200 | 46 | 77 | 10000 |
| 48 | 200 | 51 | 97 | 10000 |
| 49 | 150 | 53 | 85 | 8271 |

These examples show that the hot melt coatable packaging material-containing composition (Example 47) has peel and shear adhesion comparable to the composition not containing the packaging material (Example 48). Example 49 shows that at other post crosslink energies, the hot melt coatable packaging material-containing composition retains desirable peel and shear adhesion.

Examples 50–57

These examples describe the preparation of a hot melt adhesive composition wherein the amounts of the chain transfer agent, the crosslinker, and the photoinitiator were varied.

These examples were prepared according to the following general preparation. A partially polymerized pre-adhesive composition was prepared by mixing 90 parts of IOA, 10 parts of AA, photoinitiator (KB-1), and one-half of the amount of chain transfer agent (IOTG). The composition was placed in a container and stirred while nitrogen gas was bubbled through the mixture to exclude oxygen. The mixture was irradiated with low intensity ultraviolet light until a viscous partially polymerized pre-adhesive composition was obtained.

To the partially polymerized pre-adhesive composition, the crosslinker (BBP), and the remainder of the chain transfer agent (IOTG) were added and the composition was stirred to insure complete mixing of components.

The composition was knife coated at a thickness of about 2.5 mm (100 mils) between two sheets of 0.05 mm thick (2 mils) UV transparent polyester coated with a silicone release layer. The coated sandwich was passed through two irradiation zones where a total of 750 millijoules/cm$^2$ of energy was expended. Zone 1 was at approximately 112.5 millijoules/cm$^2$ of energy at a light intensity of 0.8 milliwatts/cm$^2$. Zone 2 was an approximately 637.5 millijoules/cm$^2$ energy zone at 2.0 milliwatts/cm$^2$. During irradiation, the coated sandwich was cooled by air impingement to remove the heat of polymerization. After passing through the two exposure zones, the polyester sheets were removed from the sandwich, the composition was placed in a hot melt coater/extruder and heated to about 177° C. The melted composition was then coated at a thickness of about 0.05 mm (2 mils) onto a silicone coated release liner. The linerless side was exposed to medium pressure mercury arc lamps and the composition was crosslinked. The tape samples were prepared and tested according to the above test methods for Peel and Shear Adhesion.

The amounts of photoinitiator, chain-transfer agent, and crosslinker used; the post crosslink energy; Peel and Shear Adhesion are given in Table 11 below.

Examples 59

This example describes the preparation of a hot melt adhesive composition with high levels of photoinitiator, chain transfer agent, and crosslinker.

The example was prepared according to the procedure described in Examples 50–57. The compositions of Examples 50 and 56 were prepared again and tested along with Example 59. The tape sample was prepared and tested according to the above-described test methods for Shear Adhesion, Molecular Weight, and Polydispersity.

The amounts of photoinitiator, chain-transfer agent, and crosslinker used; the post crosslink energy; the shear adhesion, the molecular weight, and the polydispersity are given in Table 12 below.

TABLE 11

| Ex. No. | % KB-1 | % IOTG Added to Monomer | % IOTG Added to Preadhesive compsoition | % BBP Added to Preadhesive composition | Post Xlink Energy (mJ) | Peel Adhesion Initial (N/dm) | Shear Adhesion 70° C. (minutes) |
|---|---|---|---|---|---|---|---|
| 50 | 0.20 | 0.020 | 0.020 | 0.10 | 300 | 65 | 10000 |
| 51 | 0.20 | 0.020 | 0.020 | 0.10 | 600 | 61 | 10000 |
| 52 | 0.20 | 0.020 | 0.020 | 0.10 | 900 | 30 | 10000 |
| 53 | 0.20 | 0.020 | 0.020 | 0.20 | 300 | 68 | 10000 |
| 54 | 0.20 | 0.020 | 0.020 | 0.20 | 600 | 55 | 10000 |
| 55 | 0.30 | 0.015 | 0.015 | 0.15 | 300 | 55 | 10000 |
| 56 | 0.30 | 0.015 | 0.015 | 0.15 | 600 | 50 | 10000 |
| 57 | 0.30 | 0.015 | 0.015 | 0.15 | 900 | 39 | 10000 |

Example 58

This example describes the preparation of a hot melt adhesive composition wherein the crosslinker were varied.

TABLE 12

| Ex. No. | % KB-1 | % IOTG Added to Monomer | % IOTG Added to PreAdhesive Composition | % BBP Added to PreAdhesive Composition | Post Xlink Energy (mJ) | Peel Adhesion (N/dm) | Shear Adhesion 70° C. (minutes) | Mw | P |
|---|---|---|---|---|---|---|---|---|---|
| 50 | 0.20 | 0.020 | 0.020 | 0.10 | 300 | 60.8 | 10000 | 96200 | 6.28 |
| 59 | 0.40 | 0.020 | 0.020 | 0.20 | 600 | 54.5 | 10000 | 99200 | 5.89 |
| 56 | 0.30 | 0.015 | 0.015 | 0.15 | 600 | 54.2 | 10000 | 71100 | 6.03 |

The example was prepared like Example 50 except that the crosslinker utilized was ABP and the amount of post crosslink energy used was 350 mJ. The tape sample was prepared and tested according to the above test methods for Peel and Shear Adhesion.

The Shear Adhesion at 70° C. was measured as 10,000 minutes and the Peel Adhesion was determined to be 36 N/dm.

Examples 60–68

These examples describe the preparation of a hot melt adhesive composition wherein the adhesive coating thickness and the amount of post crosslink energy were varied.

The examples were prepared according to the procedure described in Example 34 except that the amount of chain transfer agent utilized was 0.05%, the amount of photoinitiator used was 0.2%, and the total amount of photoinitiator was added in a single step to the monomers.

The coated thickness of Examples 60–61 was 0.051 mm (0.002 inches); the coated thickness of Examples 64–66 was 0.127 mm (0.005 inches); and the coated thickness of Examples 67–68 was 0.254 mm (0.010 inches). The tape samples were prepared and tested according to the above test methods for Peel and Shear Adhesion.

The post crosslink energy and the peel and shear adhesion are given in Table 13 below.

TABLE 13

| Ex. No. | Coating Thickness (mm) | Post Xlink (mJ/cm$^2$) | Peel Adhesion Initial (N/dm) | Shear Adhesion 70° C. (Minutes) |
|---|---|---|---|---|
| 60 | 0.051 | 250 | 69.85 | 1843 |
| 61 | 0.051 | 303 | 66.55 | 10000 |
| 62 | 0.051 | 360 | 61.05 | 10000 |
| 63 | 0.051 | 440 | 67.76 | 10000 |
| 64 | 0.127 | 448 | 89.65 | 7271* |
| 65 | 0.127 | 565 | 97.90 | 10000* |
| 66 | 0.127 | 760 | 86.90 | 10000* |
| 67 | 0.254 | 559 | 110 | 67* |
| 68 | 0.254 | 760 | 122.1 | 121* |

*500 g. shears

From the data it can be seen that as the adhesive thickness increases, the peel adhesion increases and the shear adhesion varies. From the data it can also be seen that for a 0.051 mm coating thickness, it is preferred to use at least 300 mJ post crosslink energy to achieve high shear adhesion values.

It will be apparent to those skilled in the art that various modifications and variations can be made in the method and article of the present invention without departing from the spirit or scope of the invention. Thus, it is intended that the present invention cover the modifications and variations of this invention provided they come within the scope of the appended claims and their equivalents.

What is claimed is:

1. A method of forming a hot melt adhesive composition comprising the steps of:
    (a) combining (i) a pre-adhesive composition which upon exposure to transmissive energy polymerizes to form a hot melt adhesive composition and (ii) a packaging material to form a packaged pre-adhesive composition; wherein said pre-adhesive composition has a viscosity less than about 50,000 centipoise at 25° C.; and
    (b) exposing said packaged pre-adhesive composition to transmissive energy to polymerize said pre-adhesive composition to form a packaged hot melt adhesive composition;
    wherein said packaging material is meltable and mixable with said holt melt adhesive so as to provide a coatable hot-melt adhesive composition when said packaged hot melt adhesive composition is melted.

2. A method according to claim 1 comprising combining said pre-adhesive composition with said packaging material by completely surrounding said pre-adhesive composition with said packaging material to form said packaged pre-adhesive composition.

3. A method according to claim 1 comprising combining said pre-adhesive composition with said packaging material by disposing said pre-adhesive composition on the surface of a sheet.

4. A method according to claim 1 comprising combining said pre-adhesive composition with said packaging material by disposing said pre-adhesive composition between a pair of sheets, at least one of which is meltable and mixable with said holt melt adhesive so as to provide a coatable hot-melt adhesive composition when said packaged hot melt adhesive composition is melted.

5. A method according to claim 1 comprising combining said pre-adhesive composition with said packaging material by introducing said pre-adhesive composition into a hollow profile in which the ratio of the length to the square root of the cross-sectional area of the profile is at least about 30:1.

6. A method according to claim 1 further comprising melting said packaged hot melt adhesive composition.

7. A method according to claim 1 comprising contacting said packaged pre-adhesive composition with a heat exchange medium while exposing said packaged pre-adhesive composition to transmissive energy to polymerize said pre-adhesive composition to form a packaged hot melt adhesive composition.

8. A method according to claim 7 comprising contacting said packaged pre-adhesive composition with a heat exchange medium comprising water.

9. A method according to claim 1 wherein said pre-adhesive composition has a viscosity less than about 50 centipoise at 25° C.

10. A method according to claim 1 wherein said pre-adhesive composition has a melting point of no greater than about 40° C.

11. A method according to claim 1 wherein said pre-adhesive composition has a melting point of no greater than about 25° C.

12. A method according to claim 1 wherein said pre-adhesive composition has a melting point of no greater than about 0° C.

13. A method according to claim 1 wherein said pre-adhesive composition comprises:
    (a) 50 to 100 parts by weight of a polymerizable component comprising at least one acrylic or methacrylic ester of a non-tertiary alkyl alcohol in which the alkyl group contains 1 to 20 carbon atoms;
    (b) 0 to 50 parts by weight of a polymerizable component comprising at least one modifying monomer, other than said acrylic or methacrylic ester, copolymerizable with component (a), the sum of (a) and (b) amounting to 100 parts by weight;
    (c) an effective amount of a polymerization initiator; and
    (d) an effective amount of a chain transfer agent.

14. A method according to claim 13 wherein said pre-adhesive composition further comprises a cross-linking agent.

15. A method according to claim 1 comprising exposing said packaged pre-adhesive composition to ultraviolet radiation to polymerize said pre-adhesive composition to form a packaged hot melt adhesive composition.

16. A method according to claim 1 comprising exposing said packaged pre-adhesive composition to thermal conduction to polymerize said pre-adhesive composition to form a packaged hot melt adhesive composition.

17. A method according to claim 1 comprising exposing said packaged pre-adhesive composition to transmissive energy to convert at least about 80% of said pre-adhesive composition to said packaged hot melt adhesive composition.

18. A method according to claim 1 comprising exposing said packaged pre-adhesive composition to transmissive energy to convert at least about 90% of said pre-adhesive composition to said packaged hot melt adhesive composition.

19. A method of forming a hot melt adhesive composition comprising the steps of:
    (a) combining (i) a pre-adhesive composition which upon exposure to transmissive energy polymerizes to form a hot melt adhesive composition and (ii) a packaging material to form a packaged pre-adhesive composition; wherein said pre-adhesive composition has a viscosity less than about 50,000 centipoise at 25° C.

(b) exposing said packaged pre-adhesive composition to transmissive energy to polymerize said pre-adhesive composition to form a packaged hot melt adhesive composition; and (c) melting said packaged hot melt adhesive composition;

wherein said packaging material is meltable and mixable with said holt melt adhesive so as to provide a coatable hot-melt adhesive composition when said packaged hot melt adhesive composition is melted.

20. A method of forming a hot melt adhesive composition comprising the steps of:

(a) combining (i) a pre-adhesive composition which upon exposure to transmissive energy polymerizes to form a hot melt adhesive composition and (ii) a packaging material by disposing said pre-adhesive composition between a pair of sheets to form a packaged pre-adhesive composition; wherein said pre-adhesive composition has a viscosity less than about 50,000 centipoise at 25° C.;

(b) exposing said packaged pre-adhesive composition to transmissive energy to polymerize said pre-adhesive composition to form a packaged hot melt adhesive composition; and (c) melting said packaged hot melt adhesive composition;

wherein at least one of said sheets is meltable and mixable with said hot melt adhesive so as to provide a coatable hot-melt adhesive composition when said packaged hot melt adhesive composition is melted.

21. A method according to claim 20 comprising removing one of said sheets prior to melting said packaged hot melt adhesive composition.

22. A method of forming an adhesive composition comprising the steps of:

(a) combining (i) a pre-adhesive composition which upon exposure to ultraviolet radiation, thermal conduction, or a combination thereof polymerizes to form an adhesive composition and (ii) a packaging material to form a packaged pre-adhesive composition, wherein said pre-adhesive composition has a viscosity less than about 50,000 centipoise at 25° C.; and (b) exposing said packaged pre-adhesive composition to ultraviolet radiation, thermal conduction, or a combination thereof to polymerize said pre-adhesive composition to form a packaged adhesive composition;

wherein said packaging material is meltable and mixable with said adhesive so as to provide a coatable adhesive composition when said packaged adhesive composition is melted.

23. A method according to claim 22 wherein said adhesive composition comprises a pressure sensitive adhesive composition.

24. A method according to claim 22 wherein said adhesive composition comprises a hot melt adhesive composition.

25. A method according to claim 22 comprising combining said pre-adhesive composition with said packaging material by completely surrounding said pre-adhesive composition with said packaging material to form said packaged pre-adhesive composition.

26. A method according to claim 22 further comprising melting said packaged adhesive composition.

27. A method according to claim 22 further comprising removing said packaging material from said adhesive composition and melting said adhesive composition.

* * * * *